UNITED STATES PATENT OFFICE.

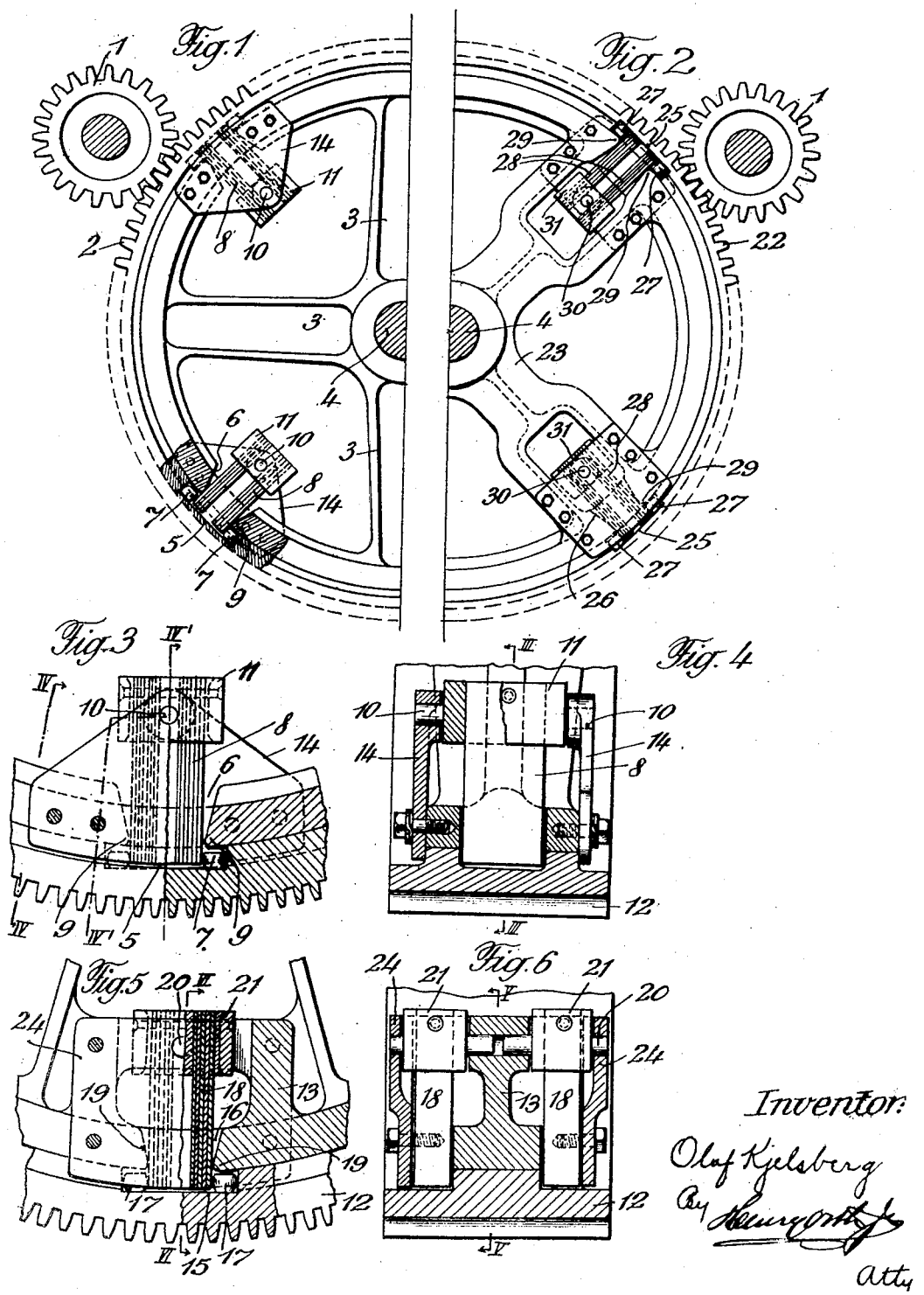

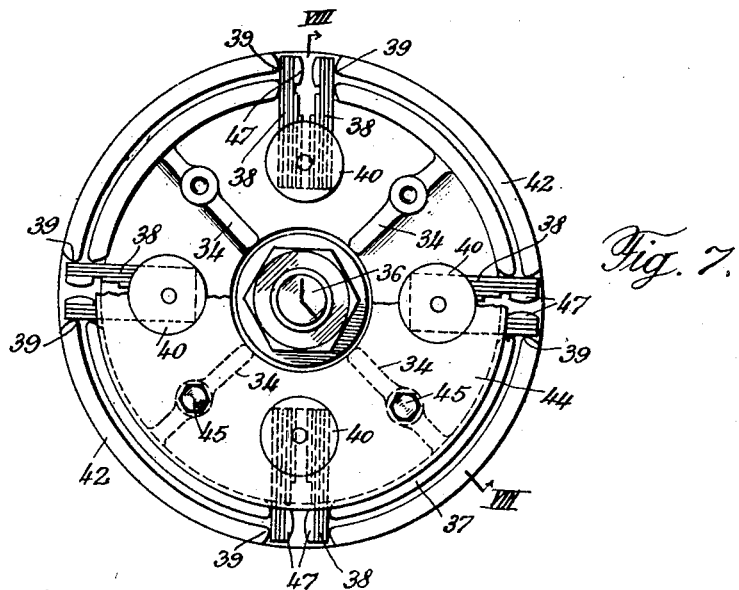
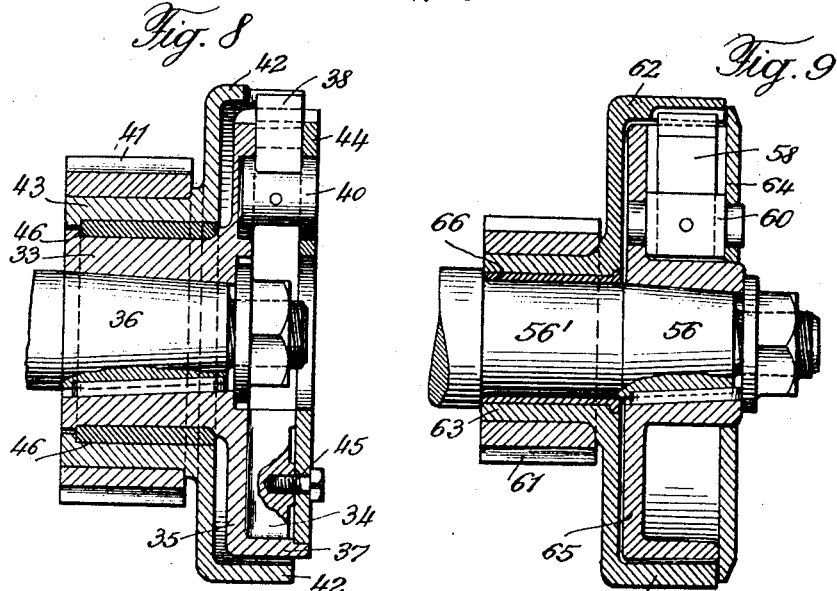

OLAF KJELSBERG, OF WINTERTHUR, SWITZERLAND.

RESILIENT GEAR WHEEL.

1,412,355.  Specification of Letters Patent.  Patented Apr. 11, 1922.

Application filed March 23, 1921. Serial No. 454,931.

(GRANTED UNDER THE PROVISIONS OF THE ACT OF MARCH 3, 1921, 41 STAT. L., 1313.)

*To all whom it may concern:*

Be it known that I, OLAF KJELSBERG, a citizen of the Republic of Switzerland, residing at Winterthur, Switzerland, have invented certain new and useful Improvements in Resilient Gear Wheels, (for which I have filed applications in Switzerland May 2, 1914, Patent No. 69,374, and in Switzerland April 21, 1917, Patent No. 76,596, and in Norway June 7, 1919, application No. 16,915/19;) and I do hereby declare the following to be a clear, full, and exact description of the invention, such as will enable others skilled in the art to which it appertains to make and use the same, reference being had to the accompanying drawing, and to letters or figures of reference marked thereon, which form a part of this specification.

This invention relates to improvements in resilient gear wheels.

In order to prevent shocks in gearings it is desirable to use resilient gear wheels. The present invention has for its object improvements in resilient gear wheels in which a toothed rim is displaceably arranged on the body of the wheel and the rotation of the latter is transmitted to the rim by the interposition of radially arranged groups of plate springs. According to the invention the springs of the group are arranged in pairs which are connected together at the inner side and are adapted to swing about pivots the axis of which is parallel to the axis of the wheel, at their outer end the pairs of plate springs are freely bearing against shoulders or edges provided on the wheel body and the toothed rim. The utilization of plate springs arranged in this manner shows great advantages, for instance they can easily be inspected and easily exchanged, further they are cheaply manufactured as the springs are composed of laminated steel plates. Heretofore only the large gear wheel of two intermeshing gear wheels has been built as a resilient wheel because springs have been used that extend in a radial direction from the toothed rim movably mounted on the hub of the wheel towards that hub, with small wheels or pinions no space is available sufficient for accommodating such springs between the hub and the toothed rim. According to another feature of the present invention provision is made to construct even the smallest pinions as resilient toothed wheels, by mounting the springs laterally to the toothed rim on the wheel body.

Several modes of carrying the invention into effect are illustrated in the accompanying drawings, in which—

Fig. 1 is a first and

Fig. 2 a second constructional example shown in side views.

Fig. 3 is a detail of Fig. 1 on a larger scale, the left half being a side view, the right half a section along line III—III of Fig. 4;

Fig. 4 is in its left half a section along line IV—IV and in its right half a section along line IV'—IV' of Fig. 3;

Figs. 5 and 6 illustrate a third constructional example of which the left half of Fig. 5 is a side view and the right half is a section along line V—V of Fig. 6 and the latter is a section along line VI—VI of Fig. 5;

Fig. 7 shows in elevation a fourth constructional example, a cover being removed in the top half of this figure;

Fig. 8 is a section along line VIII—VIII of Fig. 7 and

Fig. 9 illustrates a vertical section through a further constructional example.

A driving pinion 1 (Figs. 1 and 2) meshes with the toothed rim 2 of a driven gear wheel. The toothed rim is movably arranged on the wheel body 3 which is rigidly connected to a shaft 4. The toothed rim 2 is provided with recesses 5 which correspond to slots 6 provided on the wheel body 3. At either end of the recesses 5 a roller 7 is provided. Laminated plate springs 8 project through the slots 6 into the recesses 5, which springs serve to transmit the power from the toothed rim 2 to the wheel body and the shaft 4 respectively.

The springs 8 are arranged in two groups, one group on one side bearing against an edge 9 of the slots 6 of the wheel body and against the one of the rollers 7 and the other group bearing against the other edge 9 and the other roller 7. The springs 8 which extend to the same recess 5 are held together by a brace 11 provided with two pivots 10. The pivots are rotatably mounted in brackets 14 fixed to the wheel body.

As is shown in Figs. 5 and 6 recesses 15 and slots 16 may be provided at each side of the wheel body 13 and of the toothed rim 12 and two groups of springs tied together by a brace 21 adapted to rotate around pivots 20 may extend into each of said recesses.

In the constructional example illustrated in Figs. 1, 3 and 4 the annular part of the wheel body is subdivided by a slot 6 between two arms whereas in the two exemplifications shown in Figs. 2, 5 and 6 the slots 16 and 26 respectively are arranged in the longitudinal axis of each spoke or arm of the wheel body 13 and 23 respectively. 22 denotes the toothed rim, 25 are the recesses and 27 the rollers arranged in these recesses. The laminated plate springs 28 transmit again the power from the toothed rim 22 to the wheel body 23. 29 are the edges against which the plate springs bear. The plate springs 28 are tied together by braces 31 fitted with pivots 30.

The springs are inserted in the position shown with a certain initial tension. If a power is transmitted from the toothed rim 2 to the wheel body 3 that is greater than the initial tension of the springs, the latter will deflect and one group of springs bears against the guide 9 whilst the other group bears against the roller 7. In accordance with the deflection the toothed rim turns relatively to the wheel body. According to the power to be transmitted the number of springs is chosen.

Referring now to Figs. 7 and 8, to a motor shaft 36 an inner hub 33 is keyed, which is provided with a dish-shaped lateral enlargement 35, stiffened by ribs 34. In this enlarged part 35 the springs 38 adapted to transmit power to the toothed rim 42 are mounted. The part 35 is fitted with a cover 44 which is recessed into the annular portion 37 and is fixed to the part 35 by set screws 45. The radially arranged springs 38 are held at their one ends in pins 40 which are turnably mounted in the base of the dish 35 and in the cover 44. The other free end of the springs 38 extends to slots provided in the annular portion 42 of a second dish-like body and bears to either side against the edges 39 of said slots (Fig. 7). The second dish-shaped body surrounds the part 35 of the inner hub 33 and is integral with the outer hub 43 which carries the toothed rim 41 and which is mounted on an exchangeable bush 46 fitted to the inner hub 33. The bush 46 prevents an erosion between the two hubs 33 and 43. The springs 38 held together by the pins 40 are composed of a number of steel plates of which the outer plates are the longest and the plates situated in the middle are the shortest so that between the longest plates at the ouside an interstice is formed. Heads 47 are fitted to the sides of the outer spring plates facing each other for limiting the deflection of the springs.

When power is to be transmitted from the shaft 36 to the toothed rim 41 it is transmitted through the intermediary of the springs 38 to the outer hub which is movable relatively to the inner hub.

In the constructional example illustrated in Fig. 9 the arrangement of a resilient pinion of a small diameter is shown. This example is somewhat similar to that shown in Figs. 7—8 inasmuch as laminated plate springs 58 are secured to pivots 60, which are likewise rotatably mounted in a dish-shaped part 65 and a cover 64 fitted thereto. The part 65 is again rigidly connected to a driving shaft 56. The plate springs 58 coact with a second dish-shaped part 62 which is turnably mounted on a bush 66 carried by the cylindrical part 56′ of shaft 56. The toothed rim 61 is mounted on the hub 63 integral with the part 62. In this manner a resilient gear wheel can be built the diameter of which is only slightly larger than the diameter of the driving shaft.

The arrangements described present the advantage that the springs may be completely encased and can be easily inspected after removing the cover.

I claim:

1. In a resilient gear wheel, the combination of toothed rim and a wheel body adapted to be turned relatively to each other, and a number of groups of plate springs interposed between said rim and said body for transmitting the power between the two, each of said groups of springs being radially disposed and turnably mounted around a pivot the axis of which is parallel to the axis of the wheel.

2. In a resilient gear wheel, the combination of a toothed rim and a wheel body adapted to be turned relatively to each other, a number of groups of radially disposed plate springs, each group being held together and being pivoted to the wheel body the axes of said pivots being parallel to the axis of the wheel, shoulders provided on the toothed rim and on said wheel body for both parts of the plate springs forming each group, to bear against when transmitting power.

3. In a resilient gear wheel, the combination of a toothed rim and a wheel body adapted to be turned relatively to each other, a number of groups of radially disposed laminated plate springs, each group of springs being held together at their inner ends and being pivoted to the wheel body, the axes of said pivots being parallel to the axis of the wheel, and slots provided in said toothed rim and said wheel body for the groups of springs to project through, both parts of the plate springs forming each group bearing with their outer ends against the edges of said slots when transmitting power.

4. In a resilient gear wheel, the combination of a toothed rim and a wheel body adapted to be turned relatively to each other, a number of groups of radially disposed laminated plate springs, each group of springs being held together at their inner ends and being pivoted to the wheel body, the axes of said pivots being parallel to the axis of the wheel, slots provided in said toothed rim and said wheel body for the groups of springs to project through, both parts of the plate springs forming each group bearing with their outer ends against the edges of said slots when transmitting power, and a cover fixed to said wheel body for enclosing the springs.

In testimony that I claim the foregoing as my invention, I have signed my name.

OLAF KJELSBERG.